United States Patent
Zhang et al.

(10) Patent No.: US 11,049,409 B1
(45) Date of Patent: Jun. 29, 2021

(54) SYSTEMS AND METHODS FOR TREATMENT OF ABERRANT RESPONSES

(71) Applicant: Educational Testing Service, Princeton, NJ (US)

(72) Inventors: Mo Zhang, Plainsboro, NJ (US); Jing Chen, Princeton, NJ (US); Andre Alexander Rupp, Princeton, NJ (US); David Michael Williamson, Yardley, PA (US)

(73) Assignee: Educational Testing Service, Princeton, NJ (US)

( * ) Notice: Subject to any disclaimer, the term of this patent is extended or adjusted under 35 U.S.C. 154(b) by 275 days.

(21) Appl. No.: 14/974,721

(22) Filed: Dec. 18, 2015

Related U.S. Application Data

(60) Provisional application No. 62/094,368, filed on Dec. 19, 2014.

(51) Int. Cl.
  *G09B 7/02* (2006.01)
  *G06F 40/20* (2020.01)

(52) U.S. Cl.
  CPC ............... *G09B 7/02* (2013.01); *G06F 40/20* (2020.01)

(58) Field of Classification Search
  None
  See application file for complete search history.

(56) References Cited

U.S. PATENT DOCUMENTS

| | | | | |
|---|---|---|---|---|
| 6,115,683 A * | 9/2000 | Burstein | ............. | G06F 17/2705 434/353 |
| 2003/0165804 A1* | 9/2003 | Jongsma | ................. | G09B 7/02 434/353 |
| 2005/0142529 A1* | 6/2005 | Andreyev | ................ | G09B 7/00 434/362 |
| 2006/0003306 A1* | 1/2006 | McGinley | ................ | G09B 3/00 434/350 |
| 2006/0194183 A1* | 8/2006 | Attali | ....................... | G09B 7/02 434/322 |

(Continued)

OTHER PUBLICATIONS

"Automated Essay Scoring With E-rater® v.2.0"; Yigal Attali, Jill Burstein; Nov. 2005; The total number of pages is 27.*

(Continued)

*Primary Examiner* — Bruk A Gebremichael
(74) *Attorney, Agent, or Firm* — Jones Day

(57) ABSTRACT

Systems and methods are provided for automatically scoring a response and statistically revaluating whether it can be considered as aberrant. In one embodiment, a constructed response is evaluated via a pre-screening stage and a post-hoc screening stage. The pre-screening stage attempts to determine whether the constructed response is aberrant based on a variety of aberration metrics and criteria. If the constructed response is deemed not to be aberrant, then the post-hoc screening stage attempts to predict a discrepancy between what score an automated scoring system would assigned and what score a human rater would assign to the response. If the discrepancy is sufficiently low, then the constructed response may be scored by an automated scoring engine. On the other hand, if the constructed response failed to pass either of the two stages, then a flag may be raised to indicate that additional human review may be needed.

7 Claims, 5 Drawing Sheets

(56) References Cited

U.S. PATENT DOCUMENTS

| | | | |
|---|---|---|---|
| 2006/0286539 A1* | 12/2006 | Tidwell-Scheuring | G09B 5/00 434/353 |
| 2006/0286540 A1* | 12/2006 | Burstein | G06F 17/27 434/353 |
| 2007/0218450 A1* | 9/2007 | MacClay | G09B 5/00 434/353 |
| 2008/0126319 A1* | 5/2008 | Bukai | G06F 17/30705 |
| 2012/0131015 A1* | 5/2012 | Al Badrashiny | G06F 17/273 707/748 |

OTHER PUBLICATIONS

Bennett, Randy, Zhang, Mo; Validity and Automated Scoring; Ch. 7 in Technology and Testing: Improving Educational and Psychological Measurement, F. Drasgow (Ed.); Routledge: NCME Book Series, vol. 2; pp. 142-174; 2015.

Bejar, Isaac, Vanwinkle, Waverely, Madnani, Nitin, Lewis, William, Steier, Michael; Length of Textual Responses as a Construct-Irrelevant Response Strategy: The Case of Shell Language; Educational Testing Service, Research Report RR-13-07; Apr. 2013.

Bridgeman, Brent, Trapani, Catherine, Attali, Yigal; Comparison of Human and Machine Scoring of Essays: Differences by Gender, Ethnicity, and Country; Applied Measurement in Education, 25; pp. 27-40; 2012.

Educational Testing Service; Criterion; http://www.ets.org/criterion; 2014.

Educational Testing Service; Understanding Your TOEFL iBT Test Scores; http://www.ets.org/toefl/ibt/scores/understand/; 2014.

Foltz, Peter, Rosenstein, Mark, Lochbaum, Karen; Improving Performance of Automated Scoring Through Detection of Outliers and Understanding Model Instabilities; Paper Presented at 2013 NCME Annual Conference, San Francisco, CA; Apr. 2013.

Higgins, Derrick, Heilman, Michael; Managing What We Can Measure: Quantifying the Susceptibility of Automated Scoring Systems to Gaming Behavior; Educational Measurement: Issues and Practice, 33(3); pp. 36-46; 2014.

Higgins, Derrick, Burstein, Jill, Attali, Yigal; Identifying Off-Topic Student Essays Without Topic-Specific Training Data; Natural Language Engineering, 12(2); pp. 145-159; 2006.

Karabastos, George; Comparing the Aberrant Response Detection Performance of Thirty-Six Person-Fit Statistics; Applied Measurement in Education, 16(4); pp. 277-298; 2003.

Pearson Education Inc.; Intelligent Essay Assessor (IEA) Fact Sheet; http://kt.pearsonassessments.com; 2010.

Dowers, Donald, Burstein, Jill, Chodorow, Martin, Fowles, Mary, Kukich, Karen; Stumping E-Rater: Challenging the Validity of Automated Essay Scoring; Educational Testing Service, Research Report 01-03; Mar. 2001.

Reise, Steven, Due, Allan; The Influence of Test Characteristics on the Detection of Aberrant Response Patterns; Applied Psychological Measurement, 15(3); pp. 217-226; Sep. 1991.

Rupp, Andre; A Systematic Review of the Methodology for Person Fit Research in Item Response Theory: Lessons About Generalizability of Inferences from the Design of Simulation Studies; Psychological Test and Assessment Modeling, 55; pp. 3-38; 2013.

Vantage Learning; IntelliMetric; http://www.vantagelearning.com/products/intellimetric; 2012.

Zhang, Mo; The Impact of Sampling Approach on Population Invariance in Automated Scoring of Essays; Educational Testing Service, Research Report RR-13-18; Oct. 2013.

Zhang, Mo, Breyer, F. Jay, Lorenz, Florian; Investigating the Suitability of Implementing the E-Rater Scoring Engine in a Large-Scale English Language Testing Program; Educational Testing Service, Research Report RR-13-36; Dec. 2013.

Zhang, Mo, Chen, Jing, Ruan, Chunyi; Evaluating the Advisory Flags and Machine Scoring Difficulty in E-Rater Automated Essay Scoring; Advisory Flags and Scoring Difficulty, Educational Testing Service Research Report Series; undated.

Zhang, Mo, Chen, Jing, Ruan, Chunyi; Evaluating the Detection of Aberrant Responses in Automated Essay Scoring; Aberrant Responses in Automated Essay Scoring; Ch. 14 in Quantitative Psychology Research, L.A. van der Ark, et al. (Eds.); Springer Science + Business Media: New York, NY; 2014.

\* cited by examiner

SYSTEMS AND METHODS FOR TREATMENT OF ABERRANT RESPONSES

CROSS-REFERENCE TO RELATED APPLICATIONS

The present application claims the benefit of U.S. Provisional Application Ser. No. 62/094,368, titled "Systems and Methods for Treatment of Aberrant Responses," filed Dec. 19, 2014, the entirety of which is hereby incorporated by reference.

FIELD

This disclosure generally relates to improvement of automated scoring of constructed responses and more particularly to improvements in reliability and confidence in machine generated scores.

BACKGROUND

Automated essay scoring refers to a computer technology that automatically evaluates and grades constructed responses (e.g., open-ended written responses to a question or prompt), which are generally not amenable to exact-matching approaches (such as correspondence with a list of key words) because the specific form(s) and/or content of the correct answer(s) are not known in advance. Automated scoring has been used in various content domains including English Language Arts for constructs such as writing and speaking ability, Mathematics, and Science. Generally speaking, automated scoring involves machine extraction and aggregation of evidence or metrics from the constructed responses through both qualitative and quantitative means. In scoring essay responses, natural language processing methods are sometimes used for feature extraction (e.g., grammatical error detection and word association). Following feature extraction, the features are input into a scoring data model, which would process the features and automatically generate a score for the constructed response. The resulting score represents what a human scorer/rater would have assigned to a given response with similar features. Automated scoring is often used in large scale testing scenarios to help overcome time, cost, and generalizability issues associated with writing assessment. Automated writing assessment technology is used in both low-stakes assessment (e.g., in classroom) and high-stakes assessment (e.g., standardized tests).

Reliability of automatically generated scores is crucial, especially in high-stakes scenarios. One issue affecting reliability is the existence of aberrant responses, which are responses that are not suitable for machine scoring because they have characteristics that cannot be properly processed by the automated scoring system. Due to the unpredictability of examinees and limitations of scoring systems, automated scores generated for aberrant responses may not reflect what a human rater would have assigned. In other words, the aberrant response may receive an inaccurate score. Thus, successful identification of aberrant responses is important for the reliability of automatic essay scoring systems as a whole.

SUMMARY

Systems and methods are provided for automatically scoring a response and statistically revaluating whether it can be considered as aberrant. In one embodiment, a constructed response is evaluated via a pre-screening stage and a post-hoc screening stage. The pre-screening stage attempts to determine whether the constructed response is aberrant based on a variety of aberration metrics and criteria. If the constructed response is deemed not to be aberrant, then the post-hoc screening stage attempts to predict a discrepancy between what score an automated scoring system would assigned and what score a human rater would assign to the response. If the discrepancy is sufficiently low, then the constructed response may be scored by an automated scoring engine. On the other hand, if the constructed response failed to pass either of the two stages, then a flag may be raised to indicate that additional human review may be needed.

In one embodiment, sufficiency of aberrancy is determined. The constructed response to be evaluated is accessed from computer memory. Values relating to aberration metrics associated with aberration characteristics are extracted from the constructed response. Based on the extracted aberration metrics values and predetermined aberration criteria, a determination is made as to whether the constructed response is sufficiently aberrant. When the constructed response is determined to be sufficiently aberrant, a flag is generated to indicate that the constructed response may need further review.

In one embodiment, when the constructed response is deemed to not be aberrant, the constructed response is further evaluated using a discrepancy prediction model. Values relating to discrepancy features used by a discrepancy prediction model are extracted from the constructed response. Using the discrepancy prediction model and the extracted discrepancy features values, a discrepancy prediction is generated. The discrepancy prediction predicts a level of discrepancy between a statistically likely automated score that the constructed response would receive from an automated scoring engine and a statistically likely human score that the constructed response would receive from a human rater. When the discrepancy prediction is sufficiently high, a flag is generated to indicate that the constructed response may need further review.

In one embodiment, when the constructed response is determined to not be sufficiently aberrant and the discrepancy prediction is sufficiently low, the constructed response is scored using a scoring model. Values relating to scoring features used by a scoring model are extracted from the constructed response. The scoring model and the extracted scoring features values may then be used to generate an automated score for the constructed response.

In one embodiment, the discrepancy prediction model and scoring model are statistically calibrated using training references. For example, the discrepancy prediction model may be statistically calibrated using training responses with known discrepancies between automated scores and human scores, and the scoring model may be statistically calibrated using training responses with known human scores.

DETAILED DESCRIPTION

Detection of aberrant responses is essential if automated essay scoring technology is to be used as the primary scoring method, especially in high-stakes situations like standardized testing. From a measurement perspective, the manner in which automated scoring system handles atypical responses affects how the resulting scores are used and interpreted. For instance, if an automated scoring system is not robust against aberrant responses or fails to handle them appropriately, the system user may not have sufficient confidence in the automated scores to use them as the primary evaluation tool and may need to implement a comprehensive review process. The systems and methods described herein are aimed at improving automated scoring systems to be sensitive to aberrant responses and take appropriate action when such responses are detected.

The systems and methods described herein incorporates a two-stage process for handling aberrant responses in automated scoring systems. As will be described in more detail below, a first pre-screening stage aims to identify aberrant responses that have characteristics unsuitable for automated scoring. Responses that are deemed aberrant by the pre-screening stage may be evaluated through a different process, such as by human scorers. Responses that are not filtered out by the pre-screening stage may undergo a second post-hoc screening stage to predict whether automatically generated scores for those responses would be sufficiently close to what a human rater would assign. The post-hoc screening stage is used because, despite having passed the pre-screening stage, some of the constructed responses may nevertheless be aberrant in the sense that the automated scoring system would likely assign them scores that are insufficiently similar to what a human rater would have assigned. To address this possibility, the post-hoc screening stage is implemented to predict the likely discrepancy between a response's likely machine-generated score and likely human-assigned score. For any response whose discrepancy exceeds a certain acceptable threshold, the response may be flagged and evaluated by humans. Responses that pass both the pre-screening stage and the post-hoc screening stage may be evaluated by the automatic scoring system.

Figure 1:
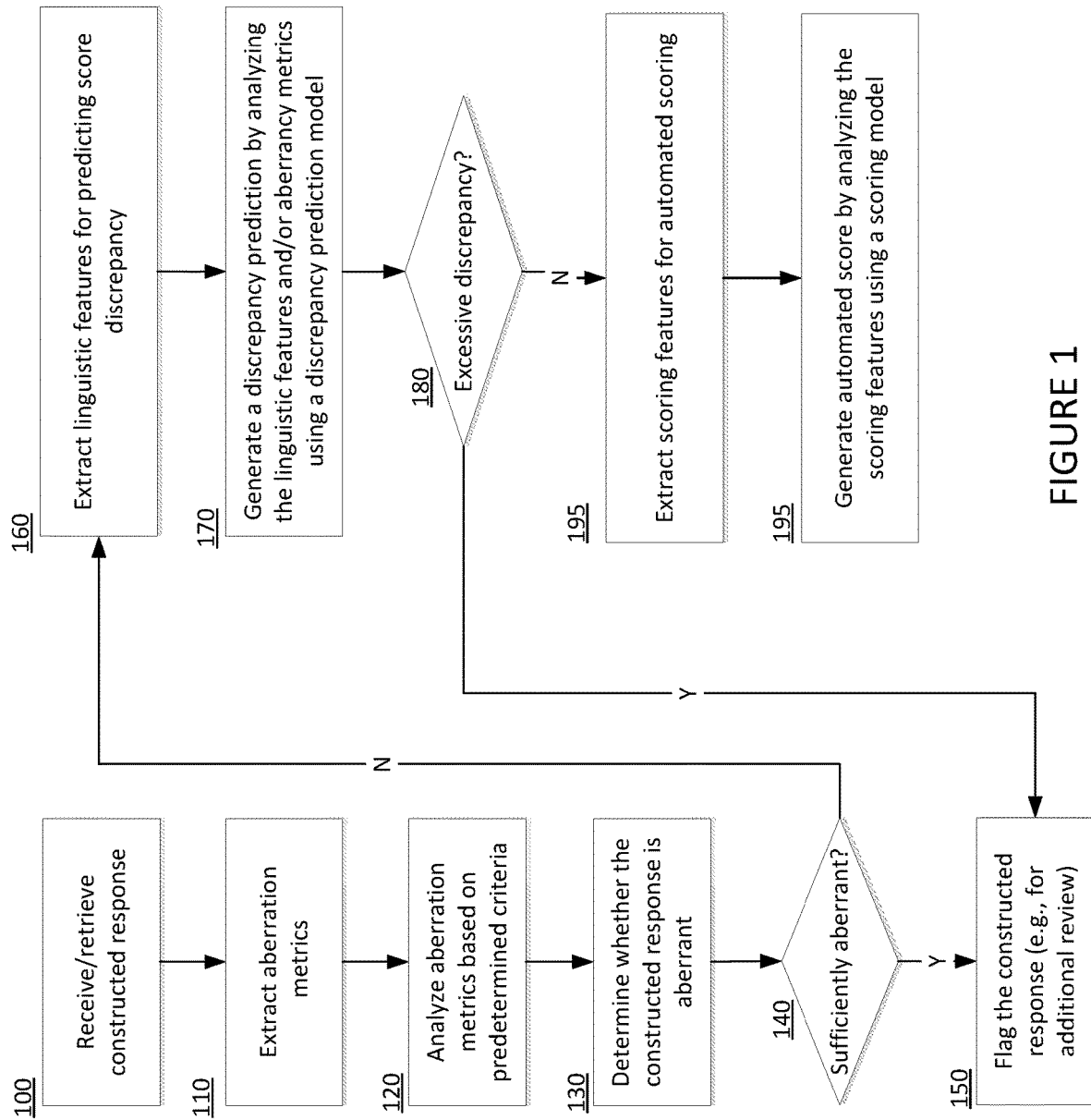
FIG. 1 is a is a flow diagram depicting an exemplary computer-implemented method of automatically scoring constructed responses and statistically evaluating whether they can be considered as aberrant

FIG. 1 is a flow diagram depicting an exemplary computer-implemented method of automatically scoring a constructed response and statistically evaluating whether it can be considered as aberrant. As previously discussed, a constructed response is an open-ended written/typed response (e.g., an essay or short answer) to a task, question, or prompt. Some constructed responses may be nonsensical or otherwise highly atypical, and therefore can be considered as outliers and should be excluded from the samples used for building or calibrating automated scoring data model. Since aberrant responses are excluded from building the scoring models, such models should not be used to score aberrant responses, as the resulting score could be unpredictable. To determine whether a constructed response is aberrant, each response undergoes pre-screening and/or post-hoc screening. In some implementations, the two-stage screening may occur in parallel. In other implementations, the two-stage screening may occur in series, in which case the later scheduled screening need not be performed if the earlier scheduled screening has already determined that a response is aberrant. Responses that pass both screening stages (i.e., not determined to be aberrant) are automatically scored.

Turning to FIG. 1, the pre-screening process for identifying aberrant responses is represented by labels 100 to 130. At 100, the scoring system receives or retrieves a constructed response from a source (e.g., a server, database, local storage or memory, examinee computer, etc.). At 110, the system processes the constructed response and extracts therefrom values relating to one or more aberrant metrics that are related to or are evidence of certain aberration characteristics. Aberration characteristics may include, but not limited to, e.g., off-topic content, foreign language, unnecessary text repetition, random keystrokes, extensive copying or paraphrasing from source materials (e.g., prompts), pre-memorized text, unusually creative content (e.g., highly metaphorical), or unexpected organization or format (e.g., poem). At 120, the extracted values are analyzed to determine which, if any, of one or more predetermined aberration criteria are satisfied by the extracted values (additional details provided below). Then at 130, the system determines whether the constructed response is sufficiently aberrant based on the extracted aberration metric values and the aberration criteria. In some embodiments, aberration determination is based on a criterion combination rule that defines one or more combinations of the aberrant criteria that must be satisfied in order for a response to be deemed sufficiently aberrant. For example, the criterion combination rule may define a subset of the aberrant criteria to be "fatal," which means satisfaction of any one of the fatal aberrant criteria would cause an associated response to be deemed sufficiently aberrant. The criterion combination rule may also define a subset of the aberrant criteria to be "non-fatal." The satisfaction of a non-fatal aberrant criterion, without more, would not necessarily cause a constructed response to be deemed aberrant. However, if two or more of the non-fatal aberration criteria are satisfied, or if a particular combination of the criteria is satisfied (as defined by the rule), then there may be enough evidence to deem an associated response as sufficiently aberrant.

The aforementioned aberrant metrics provide evidence of aberrant characteristics, such as excessive repetition, lack of key concept, irrelevance to the prompt, restatement of the prompt, off topic, overly brief, overly long, unidentifiable organization, excessive number of problems, unexpected topic, among others. Each of these will be discussed in turn.

The characteristic of "excessive repetition" refers to responses with too many repetitions of words, phrases, sentences, or text sections. In one embodiment, the metric used for measuring repetition is based on a Type/Token ratio, where Type represents the number of unique content words in a response and Token represents the number of instances of those words occurring in the response. Conceptually, a large Type/Token ratio indicates prevalence of unique words; conversely, a small Type/Token ratio indicates repetition. To qualify the degree in which a Type/Token ratio deviates from the norm, standard deviation measures may be used. In one embodiment, a z-score of a Type/Token ratio may be calculated. A z-score is a measure of the number of standard deviations a value is from a mean value, defined as:

$$z\text{-score} = (\text{value} - \text{mean}) / \text{standard-deviation}.$$

For a Type/Token z-score for a constructed response, "value" is the Type/Token ratio of the response, "mean" is the mean Type/Token ratio of a collection of reference responses, and "standard-deviation" is the standard-deviation of the Type/Token ratios of the reference responses. In one embodiment, repetition in a response is deemed excessive if its Type/Token z-score is less than a maximum threshold value (in other words, repetition is excessive if the Type/Token ratio of the response exceeds a threshold standard deviation from the mean). The particular threshold value that is appropriate or effective would vary depending on the nature of the expected responses. For example, it may be more acceptable for responses relating to a narrow field or subject (e.g., scientific) to have more repetition than other types of responses. Thus, it is up to the practitioner to understand the nature of expected responses and determine an appropriate threshold for the criterion, such as by trial and error or using empirical studies.

The characteristic of "lack of key concept" refers to insufficient development of a concept. In one embodiment, the metric used for measuring this characteristic can also be based on the Type/Token z-score detailed above. Conceptually, a response with overly little repetition of words, as indicated by a large Type/Token ratio, could indicate a lack of focus on any particular concept. Thus, in one embodiment, a response is deemed to lack a key concept if its Type/Token z-score is above a minimum threshold value. In another embodiment, the criterion for lack of key concept could be a range that the Type/Token z-score must fall within. As discussed above, the particular threshold value that is appropriate depends on the nature of the expected responses and can be determined based on empirical studies or trial-and-error experimentations.

The characteristic of "irrelevance to the prompt" refers to responses having insufficient relevance to the prompts to which the responses are directed. In one embodiment, the metric (hereinafter referred to as "PROMPTCOS") for measuring relevance is based on a comparison between the language used in a response and the language used in the prompt. In one implementation, PROMPTCOS can be calculated using content vector analysis to provide a measure of similarity between the language of the response and that of the prompt. For instance, the language of the response may be represented by one content vector and the language of the prompt may be represented by a second content vector, and the two vectors may be compared using cosine similarity to derive the PROMPTCOS value. A z-score is then computed for the PROMPTCOS value to determine the number of standard deviation the computed PROMPTCOS value deviates from the mean PROMPTCOS value observed from a collection of reference responses. Again, z-score is defined as: z-score=(value−mean)/standard-deviation. Based on this formula, a PROMPTCOS z-score for a response is computed by substituting the "value" variable with the response's PROMPTCOS value, and substituting the "mean" and "standard deviation" variables with the mean and standard deviation of PROMPTCOS values, respectively, derived from a collection of reference responses. In one embodiment, a response is deemed to be irrelevant to the prompt if its PROMPTCOS z-score is below a threshold value. Again, the particular threshold number varies depending on the nature of the expected responses.

The "restatement of the prompt" characteristic refers to responses that restate the prompt. As discussed above, the PROMPTCOS metric measures the similarity between language used in a response and language used in the corresponding prompt. Thus, in one embodiment, whether a PROMPTCOS z-score exceeds a particular threshold can be the criterion for determining excessive overlap of content between the response and the prompt. In another embodiment, the criterion sets a range limit on the number of standard of deviations from the mean that a response's PROMPTCOS value can acceptably be. Once again, the particular threshold value is dependent on the nature of the expected responses and can be selected based on trial and error or through empirical studies.

The "off topic" characteristic refers to responses that deviate from an expected topic. In one embodiment, likelihood of a response being off topic can be determined based on occurrences of words in the response that that are found in on-topic reference responses and words that are found in general use. An index for the reference, hereinafter referred to TOPICNES, may be computed to indicate the level of words that are (1) common in on-topic responses and (2) uncommon in a general pool of unrelated responses. In one embodiment, TOPICNES may be computed based on the occurrence rates of words relating to the particular topic and occurrence rates of words of general use. Conceptually, a greater presence of words found in on-topic responses indicates that the response is likely on topic. Thus, in one embodiment, a criterion for determining that a response is off topic is if the response's TOPICNES is equal to or below a particular threshold value. The particular threshold value depends on the nature of the expected response and can be selected based on trial and error or through empirical studies.

The "overly brief" characteristic refers to responses that are excessively short in length compared to what is expected. In one embodiment, a SENTENCES metric counts the number of sentences in a response and a WORDS metric counts the number of words in the response. In one embodiment, the criteria for indicating that a response is overly brief may be based on a comparison of the SENTENCES and/or WORDS metrics with threshold lengths (e.g., a response is overly brief if either or both of its SENTENCES and WORDS metrics fall below corresponding thresholds). Again, the particular threshold value depends on the nature of the expected response and can be selected based on trial and error or through empirical studies.

The "overly long" characteristic refers to responses that are excessively long in length compared to what is expected. In one embodiment, metrics such as WORDS and SENTENCES, as described above with respect to the "overly brief" characteristic, may be used to assess length. In one embodiment, the criterion for determining that a response is overly long may be based on a comparison of the WORDS and/or SENTENCES metrics with threshold lengths. For example, a response may be deemed overly long if one or both of its WORDS and SENTENCES metrics exceed corresponding thresholds. The particular threshold value depends on the nature of the expected response and can be selected based on trial and error or through empirical studies.

The "unidentifiable organization" characteristic refers to instances where discourse transitions (e.g., background-to-main-point, main-point-to-thesis, background-to-conclusion, etc.) in a response cannot be properly identified. Different types of discourse transactions may be automatically identified using algorithms and tools known in the art. Unidentifiable discourse transactions may be due to various reasons, including random sentences or words, not enough written content, gibberish, etc. Thus, conceptually the inability to identify such discourse transitions may be evidence that a response is aberrant. In one embodiment, the metric for measuring "unidentifiable organization" may be based on the number of identifiable discourse transitions. If the number of identifiable transitions falls below a certain threshold, then the response's organization is deemed to be unidentifiable and serves as evidence of aberrancy. The particular threshold value depends on the nature of the expected response and can be selected based on trial and error or through empirical studies.

Another characteristic of aberrant response is the existence of excessive number of problems or errors. A number of metrics may be used to measure errors. For example, a GRAMMAR metric may be used to measure the prevalence of grammatical errors, normalized by the number of words. For example, GRAMMAR may be defined as:

$$\text{GRAMMAR}=(G_1+G_2+\ldots G_n+1)/\text{WORDS},$$

where each $G_n$ represents the presence or absence (1 or 0) of a particular grammatical error. Similarly, a USAGE metric may be used to measure the prevalence of usage errors, a MECHANICS metric may be used to measure the prevalence of mechanics errors, and a STYLE metric may be used to measure the prevalence of stylistic errors. Each of these types of errors may be detected using conventional means, such as using regular expressions, dictionary, vector analysis, statistical models, etc. Each instance of one of these metrics exceeding a corresponding threshold supports a conclusion of excessive errors.

In addition, abnormally short words or abnormally long words may also indicate aberrancy. The WDLN metric may be used to measure the average word length, and may be computed by dividing the number of characters in the response by the number of words in the response. If WDLN does not fall within a threshold range, then a word length problem may exist. Another indicator of aberrancy is the lack of variety in word choice. In one embodiment, lack of variety may be detected by a WFLOW metric that attempts to calculate the lowest fifth percentile of word frequency in the response. If the lowest fifth percentile cannot be computed, it may be due to a lack of word variety in the response. A finding of unusual average world length (WDLN), lack of word variety (WFLOW), and/or grammatical (GRAMMAR), usage (USAGE), mechanical (MECHANICS), or stylistic (STYLE) errors can each support a conclusion of excessive errors/problems in the response.

Lastly, the "unexpected topic" characteristic refers to responses relating to unexpected topics. In one embodiment, the metric for measuring this characteristic may be based on a comparison between a response with the prompt for which the response was written, as well as comparisons between the response and a set of reference prompts. Conceptually, a response is likely on topic if it is more similar to the prompt for which it is written than to other prompts. In one implementation, content vector analysis may be used to compare the response to the various prompts. In one embodiment, the criterion for determining "unexpected topic" may be based on whether the similarity score between the response and the prompt for which it is written is within a threshold top percentile or number of scores. If it is outside of the top percentile or scores, then the response may be deemed on an unexpected topic. Again, the particular threshold is dependent on the nature of the expected response and may be determined empirically or through trial and error.

Referring again to FIG. 1, at 140 the system determines whether the constructed response is sufficiently aberrant. If it is, then the constructed response should not be scored by the automatic scoring system and should be evaluated by an alternate means. In one embodiment, constructed responses deemed sufficiently aberrant are flagged 150 to indicate that additional review (e.g., by human raters) may be needed.

If, on the other hand, the system at 140 determines that the constructed response is not sufficiently aberrant, then the constructed response may be further evaluated by a post-hoc screening procedure. While the embodiment depicted in FIG. 1 performs the pre-screening and post-hoc screening in series and in that order, the system/method described herein is not limited to such an arrangement. For example, the post-hoc screening may be performed before the pre-screening, and alternatively the two screening stages may also be performed in parallel (e.g., using two separate processors). The depicted embodiment, however, provides the advantage of allowing the post-hoc screening stage to be omitted depending on the outcome of the pre-screening stage. Specifically, if the pre-screening already deems the constructed response to be aberrant, the post-hoc screening need not be performed. This advantage is particularly useful where computational resources are limited.

As discussed above, post-hoc screening aims to predict a level of discrepancy between a statistically likely automated score that the constructed response would receive from an automated scoring engine and a statistically likely human score that the constructed response would receive from a human rater. In one embodiment, the prediction may be performed using a discrepancy prediction model. In one implementation, the discrepancy prediction model may be a linear combination (or other statistical data model) of features, such as, but not limited to, linguistic features found in responses, activity measures relating to processes in which responses are constructed (e.g., time taken to complete a response), data associated with demographic characteristics of authors of responses (e.g., ethnicity, gender, native language, etc.), features associated with the aforementioned aberration criteria (e.g., off topic responses, excessive repetition, insufficient concept development, unusual organization, excessive errors, etc.), among others. The discrepancy prediction model may be statistically calibrated using a collection of training responses with known discrepancies between their respective automated scores and human scores. As part of the calibration process, features used in the model are extracted from the reference responses. The extracted data, together with the known discrepancies, are used to calibrate/train the model. In an embodiment where the model is represented by a linear combination of features (the independent variables) to predict a discrepancy level or probability (the dependent variable), calibrating or training may involve using linear regression to determine the best weights/coefficients for each of the features.

Post-hoc screening in FIG. 1 is represented by labels 160 and 170. At 160, features using in the discrepancy prediction model are extracted from the constructed response. In one embodiment, the features are linguistic features, but as discussed above other features may also be used. At 170, the extracted features are analyzed using the discrepancy prediction model. In some embodiments, the features used by the model further includes one or more of the aberration metrics, such as whether the response is off topic, too long, too short, includes too many errors, etc. Based on the feature values, the discrepancy prediction model would generate a discrepancy prediction. In some embodiments, the discrepancy prediction is a numerical value representing the likely difference between what an automated scoring system and what a human rater would assign to the constructed response. In another embodiment, the discrepancy prediction may be a probability or likelihood of an automatically generated score being excessively discrepant from a corresponding human score (e.g., the likelihood of the discrepancy being above a particular threshold).

At 180, a determination is made as to whether the discrepancy is excessive. In one embodiment, a discrepancy is excessive if the discrepancy prediction from 170 exceeds a threshold. If so, the system may generate a flag 150 for the constructed response to indicate that additional review (e.g., by a human) may be needed. On the other hand, if the discrepancy prediction is within an acceptable range, the constructed response may proceed to be scored by the automated scoring engine.

In one embodiment, the automated scoring engine utilizes a scoring model that includes various scoring features (e.g., linguistic features of responses). In some implementations, the scoring model is a mathematical model, such as a linear combination of features with corresponding coefficients/weights. In such a model, features are independent variables and an automated score is the dependent variable. The model may be statistically trained or calibrated using a collection of training responses with known human scores. The training may involve extracting the model features from the training responses and using the extracted feature values and the known human scores as data points for regression analysis. Through regression analysis, coefficients/weights for the features may be ascertained. In another embodiment, the automated scoring engine may be, for example, the e-rater® engine developed by Educational Testing Service (ETS).

The automated scoring process is represented in FIG. 1 by labels 190 and 195. At 190, scoring features used in a scoring model are extracted from the constructed response. In one embodiment, the scoring features are linguistic features. At 195, the extracted scoring features are analyzed using the scoring model, which is calibrated/trained to predict what score a human rater would assign based on the extracted scoring features. For example, the output of the scoring model may be a numeric automated score.

As discussed above, scoring models are designed to provide scores that as best as possible predict scores that would be independently assigned by manual, human raters. While effective automated scoring models have been designed for scoring typical responses, such models may produce inaccurate scores when scoring aberrant responses that differ from or are outliers from typical responses. However, by using the process described above, a scored constructed response would have passed both the pre-screening stage and the post-hoc screening stage, thus decreasing the likelihood of the constructed response being aberrant. Consequently, the automated score generated by the scoring model can be afforded additional confidence. Had the constructed response failed either one of the screening (therefore unsuitable for machine scoring), the response may be routed to an alternative scoring process, such as to a differently-calibrated scoring system or to human raters.

Figure 2:
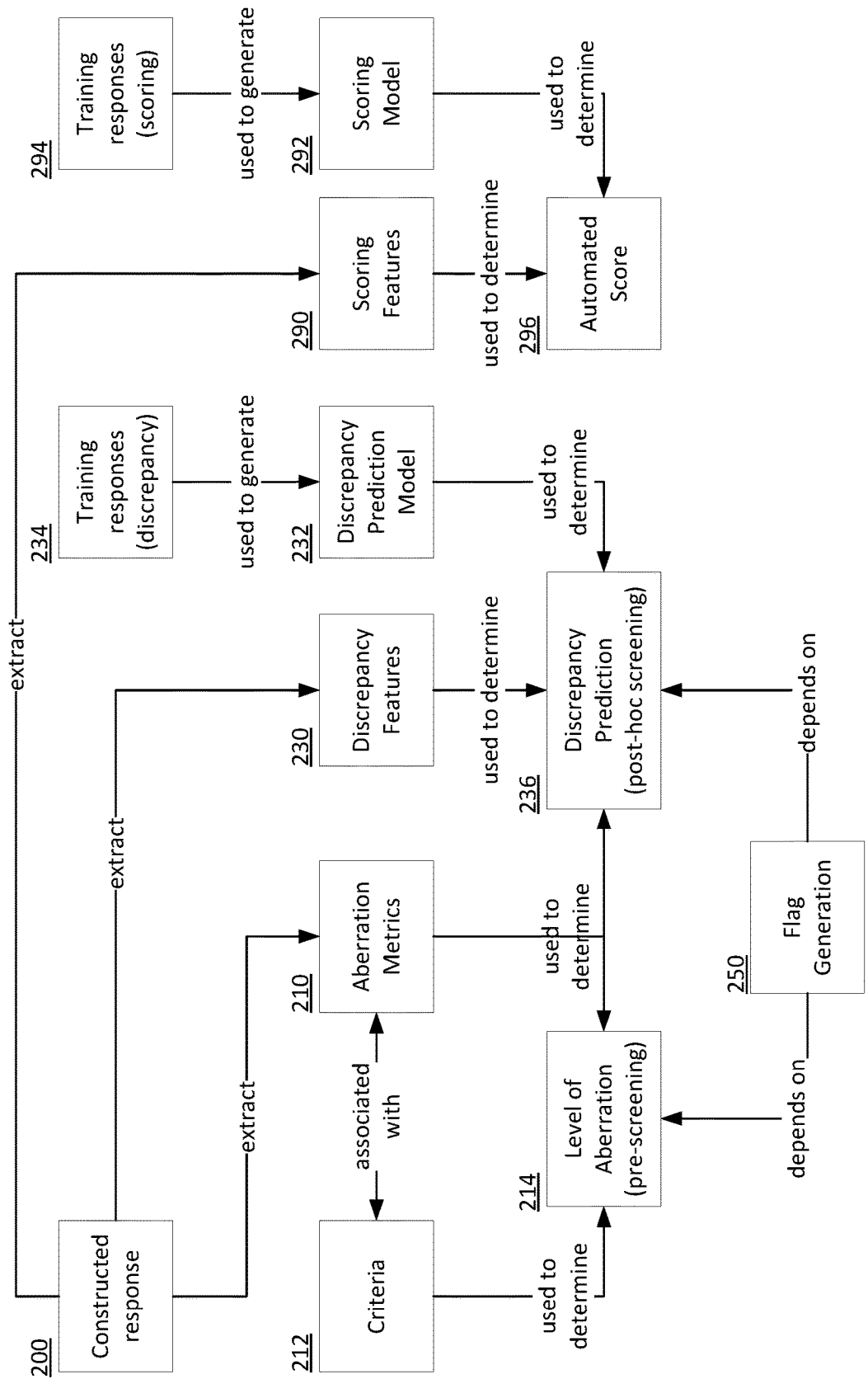
FIG. 2 is a block diagram depicting components used by an exemplary computer-implemented system for automated scoring constructed responses and statistically evaluating whether they can be considered as aberrant.

FIG. 2 is a block diagram depicting components used by an exemplary computer-implemented system for automated scoring constructed responses and statistically evaluating whether they can be considered as aberrant. The exemplary response under evaluation is represented by constructed response 200. For pre-screening, the constructed response 200 is analyzed so that aberration metrics 210 can be extracted. As detailed above, aberration metrics may include Type (the number of unique word types occurring in the response), Token (instances of unique words in the response), average word length, vector comparisons between the response and prompt to which the response is written, etc. The aberration metrics 210 are associated with aberration criteria 212. For example, an aberration criterion may specify a condition that when satisfied by a corresponding aberration metric would be evidence of aberrancy (e.g., a Type/Token ratio falling below a certain threshold). In addition, a criterion combination rule may specify particular combinations of aberration criteria that when satisfied would cause the constructed response 200 to be deemed sufficiently aberrant. Thus, in one embodiment the aberration metrics 210, aberration criteria 212, and optionally the criterion combination rule may be used to determine the level or sufficiency of aberration of the constructed response 200. If the constructed response 200 is deemed sufficiently aberrant at 214, a flag 250 may be generated to indicate potential need for additional or alternative review. In some embodiments, an aberrant score may also be automatically provided a low score.

For post-hoc screening, the constructed response 200 is analyzed using a discrepancy prediction model 232. As discussed above, the discrepancy prediction model 232 may be calibrated/trained using a collection of training responses 234 with known human-machine discrepancy or disagreement values. Values for discrepancy features 230 (e.g., linguistic features) used in the discrepancy prediction model 232 may be extracted from the constructed response 200. In some embodiments, the discrepancy prediction model 232 may also include features associated with the aberration metrics 210. Thus, when analyzing the constructed response 200 with the discrepancy prediction model 232, the extracted discrepancy features 230 and certain extracted aberration metrics 210 may be used to determine a discrepancy prediction 236 for the constructed response 200. If the discrepancy prediction 236 is sufficiently high (i.e., excessively discrepant), then a flag may be generated 250 to indicate that the constructed response 200 may need additional or alternative review.

If the constructed response 200 passes both the pre-screening and post-hoc screening procedures (e.g., sufficiently low level of aberration 214 and discrepancy prediction 236), then the constructed response 200 may be automatically scored. As discussed above, the scoring model 292 used for scoring may be trained based on a collection of training responses 294 with known human-assigned scores. The scoring model 292 includes various scoring features, such as linguistic features. For each scoring feature, a corresponding feature value is extracted 290 from the constructed response 200. The extracted scoring features 290 and the scoring model 292 are then used to determine an automated score 296, which represents a prediction of the score that a human rater would assign to the constructed response 200. If the constructed response 200 passed both the pre-screening and post-hoc screening stages, the automated score 296 may be used as the primary or final score without additional human review (but human review may still be used if desired).

The pre-screening, post-hoc screening, and scoring may be performed in any order, including in parallel. In one embodiment, pre-screening occurs first, and then post-hoc screening, followed by scoring. In another embodiment, post-hoc screening may occur before pre-screening, but both before scoring is performed. In yet another embodiment, pre-screening and post-hoc screening may occur in parallel, followed by scoring, or all three may be performed simultaneously. If certain sequencing is involved, later-scheduled process(es) may or may not be performed depending on the outcome of the earlier-scheduled process(es). For example, post-hoc screening may not be performed if an earlier-performed pre-screening already determined that a constructed response is aberrant. In some embodiments, scoring may be performed only for constructed responses that pass both screening stages. In another embodiment, scoring may be performed regardless of the screening outcome, but responses that have been flagged (e.g., for failing one or both of the screening stages) would call for further scrutiny or human review.

Figure 3A:
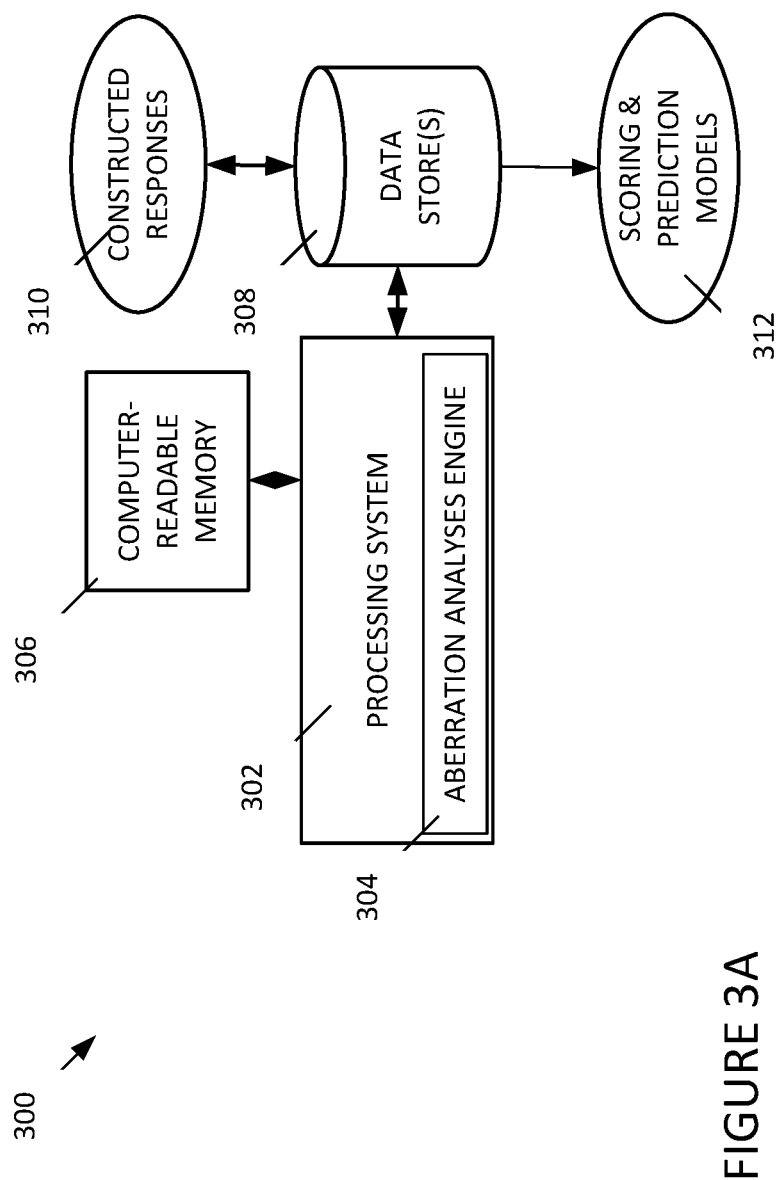
FIGS. 3A, 3B, and 3C depict example systems for use in implementing an automated scoring system with aberration analyses capabilities.
Figure 3B:
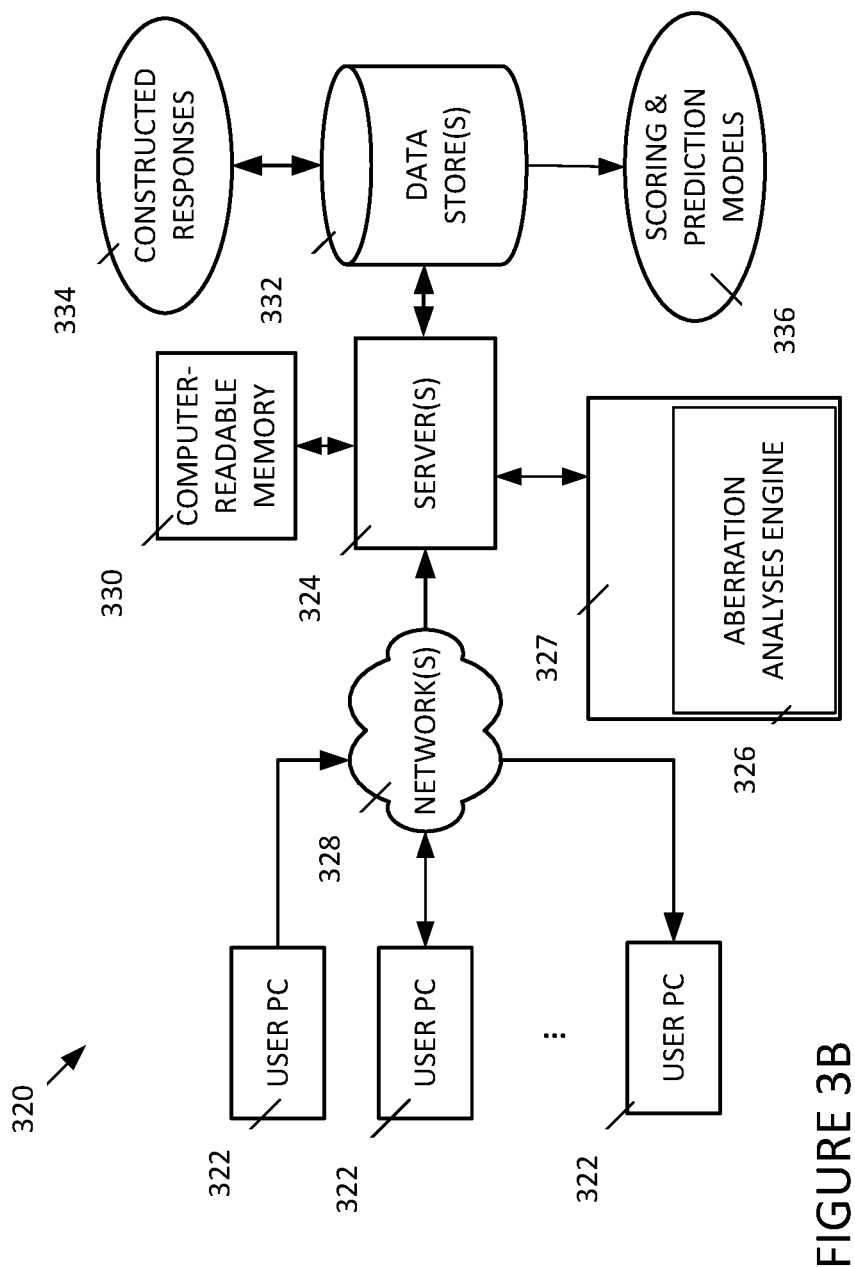
Figure 3C:
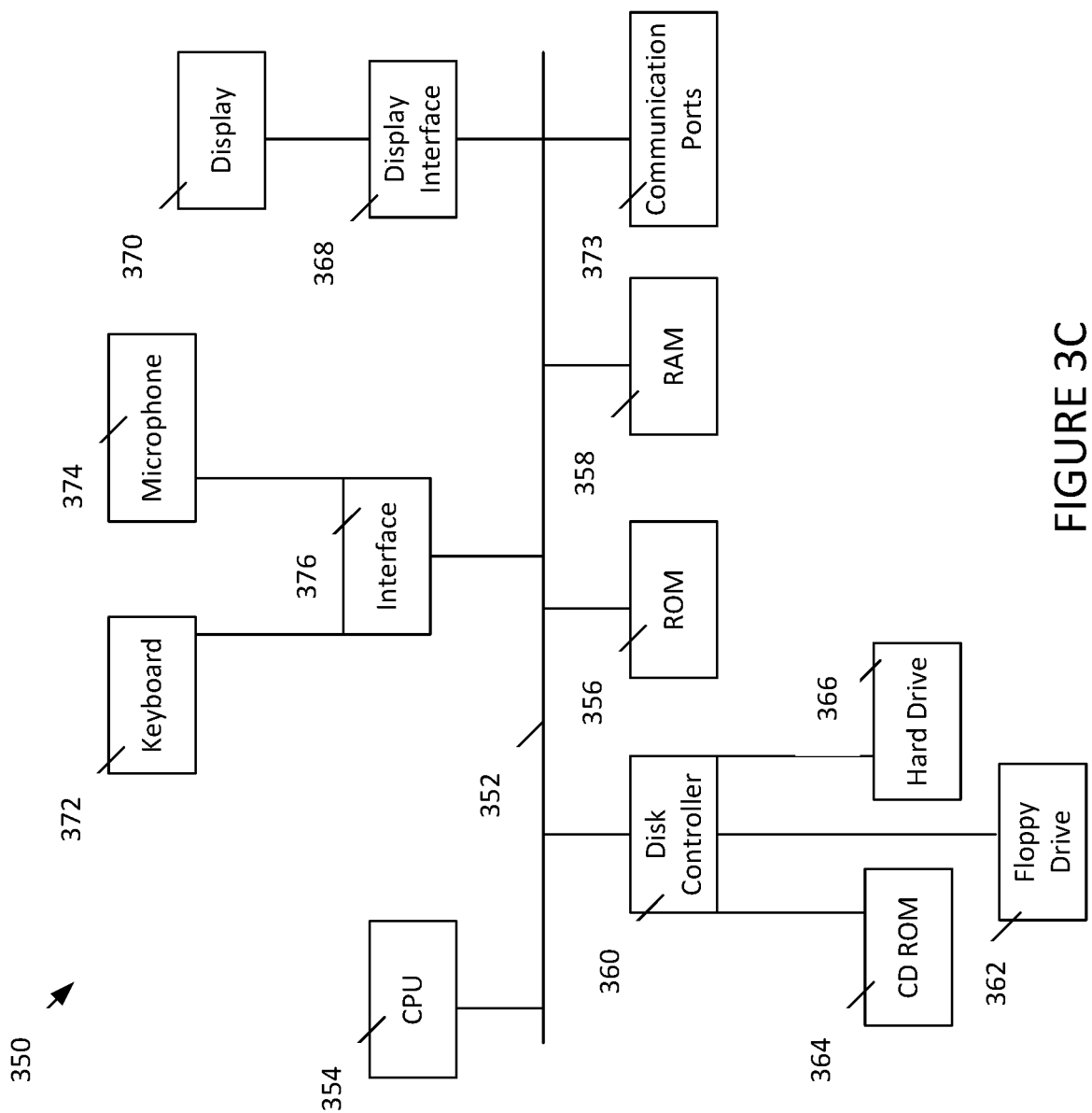

Additional examples will now be described with regard to additional exemplary aspects of implementation of the approaches described herein. FIGS. 3A, 3B, and 3C depict example systems for use in implementing an automated scoring system with an aberration analyses engine. For example, FIG. 3A depicts an exemplary system 300 that includes a standalone computer architecture where a processing system 302 (e.g., one or more computer processors located in a given computer or in multiple computers that may be separate and distinct from one another) includes an aberration analyses engine 304 being executed on it. The processing system 302 has access to a computer-readable memory 306 in addition to one or more data stores 308. The one or more data stores 308 may include constructed responses 310 as well as scoring and discrepancy prediction models 312.

FIG. 3B depicts a system 320 that includes a client server architecture. One or more user PCs 322 access one or more servers 324 running an automated scoring system with an aberration analyses engine 326 on a processing system 327 via one or more networks 328. The one or more servers 324 may access a computer readable memory 330 as well as one or more data stores 332. The one or more data stores 332 may contain constructed responses 334 as well as scoring and discrepancy prediction models 336.

FIG. 3C shows a block diagram of exemplary hardware for a standalone computer architecture 350, such as the architecture depicted in FIG. 3A that may be used to contain and/or implement the program instructions of system embodiments of the present invention. A bus 352 may serve as the information highway interconnecting the other illustrated components of the hardware. A processing system 354 labeled CPU (central processing unit) (e.g., one or more computer processors at a given computer or at multiple computers), may perform calculations and logic operations required to execute a program. A non-transitory processor-readable storage medium, such as read only memory (ROM) 356 and random access memory (RAM) 358, may be in communication with the processing system 354 and may contain one or more programming instructions for performing the method of implementing an automated scoring system with aberration analyses capabilities. Optionally, program instructions may be stored on a non-transitory computer readable storage medium such as a magnetic disk, optical disk, recordable memory device, flash memory, or other physical storage medium.

A disk controller 360 interfaces one or more optional disk drives to the system bus 352. These disk drives may be external or internal floppy disk drives such as 362, external or internal CD-ROM, CD-R, CD-RW or DVD drives such as 364, or external or internal hard drives 366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 360, the ROM 356 and/or the RAM 358. Preferably, the processor 354 may access each component as required.

A display interface 368 may permit information from the bus 352 to be displayed on a display 370 in audio, graphic, or alphanumeric format. Communication with external devices may optionally occur using various communication ports 373.

In addition to the standard computer-type components, the hardware may also include data input devices, such as a keyboard 372, or other input device 374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of automatically scoring a constructed response and statistically evaluating whether it is an aberrant response, comprising:
   collecting reference responses with known discrepancies between their automated scores and human scores;
   extracting values relating to discrepancy features from the reference responses;
   training a discrepancy prediction model with the automated scores of the reference responses, the human scores of the reference responses, and the values relating to discrepancy features extracted from the reference responses; wherein the discrepancy prediction model predicts a level of discrepancy between scores from an automated scoring engine and a human score from a human rater;

receiving a constructed response from a source; wherein the source is a server, database, local storage or memory, or examinee computer;

extracting, from the constructed response, values relating to aberration metrics associated with a plurality of aberration characteristics selected from the group consisting of excessive repetition, lack of key concept, irrelevance to a prompt, restatement of a prompt, off topic, overly brief, overly long, unidentifiable organization, excessive number of problems, and unexpected topic;

determining that the constructed response is not sufficiently aberrant based on the extracted aberration metrics values and a predetermined set of aberration criteria;

extracting, from the constructed response, values relating to discrepancy features used by the discrepancy prediction model; and generating a discrepancy prediction using the discrepancy prediction model and the values relating to discrepancy features extracted from the constructed response;

extracting, from the constructed response, values relating to scoring features used by a scoring model; and generating an automated score for the constructed response using the scoring model and the extracted scoring features values.

2. The method of claim 1, wherein the training responses used for calibrating the discrepancy prediction model are empirically determined.

3. The method of claim 1, wherein the discrepancy prediction model's discrepancy features include linguistic features of responses.

4. The method of claim 1, wherein the discrepancy prediction model's discrepancy features include activity measures relating to processes in which responses are constructed.

5. The method of claim 1, wherein the discrepancy prediction model's discrepancy features include data associated with demographic characteristics of response authors.

6. A computer-implemented system for automatically scoring a constructed response and statistically evaluating whether is an aberrant response, comprising:

a processing system;

one or more computer-readable mediums encoded with instructions for commanding the processing system to execute steps comprising:

extracting values relating to discrepancy features from a collection of reference responses with known discrepancies between the reference responses' automated scores and human scores;

training a discrepancy prediction model with the automated scores of the reference responses, the human scores of the reference responses, and the values relating to discrepancy features extracted from the reference responses; wherein the discrepancy prediction model predicts a level of discrepancy between scores from an automated scoring engine and a human score from a human rater;

receiving a constructed response from a source; wherein the source is a server, database, local storage or memory, or examinee computer;

extracting, from the constructed response, values relating to aberration metrics associated with a plurality of aberration characteristics selected from the group consisting of excessive repetition, lack of key concept, irrelevance to a prompt, restatement of a prompt, off topic, overly brief, overly long, unidentifiable organization, excessive number of problems, and unexpected topic;

determining that the constructed response is not sufficiently aberrant based on the extracted aberration metrics values and a predetermined set of aberration criteria;

extracting, from the constructed response, values relating to discrepancy features used by the discrepancy prediction model;

generating a discrepancy prediction using the discrepancy prediction model and the values relating to discrepancy features extracted from the constructed response;

extracting, from the constructed response, values relating to scoring features used by a scoring model; and generating an automated score for the constructed response using the scoring model and the extracted scoring features values.

7. A non-transitory computer-readable medium encoded with instructions for commanding a processing system to execute steps for automatically scoring a constructed response and statistically evaluating whether it is an aberrant response, the steps comprising:

extracting values relating to discrepancy features from a collection of reference responses with known discrepancies between the reference responses' automated scores and human scores;

training a discrepancy prediction model with the automated scores of the reference responses, the human scores of the reference responses, and the values relating to discrepancy features extracted from the reference responses; wherein the discrepancy prediction model predicts a level of discrepancy between scores from an automated scoring engine and a human score from a human rater;

receiving a constructed response from a source; wherein the source is a server, database, local storage or memory, or examinee computer;

extracting, from the constructed response, values relating to aberration metrics associated with a plurality of aberration characteristics selected from the group consisting of excessive repetition, lack of key concept, irrelevance to a prompt, restatement of a prompt, off topic, overly brief, overly long, unidentifiable organization, excessive number of problems, and unexpected topic;

determining that the constructed response is not sufficiently aberrant based on the extracted aberration metrics values and a predetermined set of non fatal aberration criteria;

extracting, from the constructed response values relating to discrepancy features used by the discrepancy prediction model;

generating a discrepancy prediction using the discrepancy prediction model and the values relating to discrepancy features extracted from the constructed response;

extracting, from the constructed response, values relating to scoring features used by a scoring model; and generating an automated score for the constructed response using the scoring model and the extracted scoring features values.

\* \* \* \* \*